United States Patent
Hadley et al.

(10) Patent No.: US 9,868,833 B2
(45) Date of Patent: Jan. 16, 2018

(54) IMPROVEMENTS TO MATRIX ADDITIVES

(71) Applicant: Hexcel Composites Limited, Duxford (GB)

(72) Inventors: Philip Hadley, Ely (GB); Ben Tipler, Water Beach (GB); Dana Blair, Bourn Cambs (GB)

(73) Assignee: Hexcel Composites, Limited, Duxford (GB)

( * ) Notice: Subject to any disclaimer, the term of this patent is extended or adjusted under 35 U.S.C. 154(b) by 0 days.

(21) Appl. No.: 15/100,303

(22) PCT Filed: Dec. 24, 2014

(86) PCT No.: PCT/EP2014/079302
§ 371 (c)(1),
(2) Date: May 28, 2016

(87) PCT Pub. No.: WO2015/097283
PCT Pub. Date: Jul. 2, 2015

(65) Prior Publication Data
US 2016/0369074 A1 Dec. 22, 2016

(30) Foreign Application Priority Data

Dec. 24, 2013 (GB) .................................. 1322984.4
Dec. 24, 2013 (GB) .................................. 1322988.5

(51) Int. Cl.
C08L 83/00 (2006.01)
C08J 5/24 (2006.01)
C08J 3/12 (2006.01)
C08J 5/10 (2006.01)

(52) U.S. Cl.
CPC ................. *C08J 5/24* (2013.01); *C08J 3/126* (2013.01); *C08J 5/10* (2013.01); C08J 2363/00 (2013.01); C08J 2377/00 (2013.01); C08J 2400/24 (2013.01); *C08J 2463/00* (2013.01); *C08J 2477/00* (2013.01)

(58) Field of Classification Search
CPC ....... C08J 5/24; C08J 3/126; C08J 5/10; C08J 2363/00
See application file for complete search history.

(56) References Cited

U.S. PATENT DOCUMENTS

| 4,778,851 | A | 10/1988 | Henton et al. | |
|---|---|---|---|---|
| 6,262,152 | B1 * | 7/2001 | Fryd | ....................... B01F 17/00 523/205 |
| 7,754,322 | B2 * | 7/2010 | Tilbrook | ................ C08G 59/38 428/297.4 |
| 2012/0164455 | A1 * | 6/2012 | Griffin | ....................... C08J 5/24 428/413 |
| 2013/0310484 | A1 * | 11/2013 | Furukawa | .................. C08J 5/24 523/201 |

FOREIGN PATENT DOCUMENTS

| EP | 2662414 A1 | 11/2013 |
|---|---|---|
| EP | 2687380 A2 | 1/2014 |
| JP | 2010 116484 A | 5/2010 |
| WO | 2005/061087 A1 | 7/2005 |
| WO | 2008/127556 A1 | 10/2008 |

OTHER PUBLICATIONS

JP2010 116484A—English translation.

* cited by examiner

*Primary Examiner* — Hannah Pak
(74) *Attorney, Agent, or Firm* — W. Mark Bielawski; David J. Oldenkamp

(57) ABSTRACT

This invention relates to an additive for a thermoset resin matrix having a core and a reactive cross-linked thermoset coating. The reactive cross-linked thermoset coating is the reaction product of a thermoset resin and a curative in a dispersant.

4 Claims, No Drawings

IMPROVEMENTS TO MATRIX ADDITIVES

INTRODUCTION

The present invention relates to additives for a matrix, in particular additives comprising a core material and a cross-linked thermoset shell, a prepreg containing such additives and a method of making such additives. The additives of the present invention are suited for use in a thermoset resin matrix, and in particular, with a composite material.

BACKGROUND

Composite laminar structures are strong and light-weight. Their use is well known and they are frequently used in automotive, aerospace, sporting goods and marine applications.

Typically composite materials are manufactured by stacking layers of a fibrous reinforcement material which is preimpregnated with a curable resin material (prepreg). The resin material is then cured by heating the stack whilst it is being compressed. This causes the resin to flow to consolidate the fibrous stack, and then to subsequently cure. This results in an integral laminar composite structure.

Composite materials can also be formed by arranging layers of dry fibrous material into a mould and then infusing with a curable resin. The resin wets out the fibres of the dry material before being cured. This process is known as resin transfer moulding (RTM).

Both methods result in a composite material with a laminar structure having a series of layers of impregnated fibrous reinforcement. Between these layers is a resin rich layer distinguished by an absence of reinforcement fibres known as the interleaf or interlayer.

Thermoset resins, and in particular epoxy resins, can be brittle due to their cross-linked interpolymer networks. The highly cross-linked thermoset resin matrices that are used for more high strength applications such as aerospace structures can be exceptionally brittle. There exists a need improve their toughness in order to be suited for such applications. This is normally achieved with the addition of tougheners to the resin matrix. Typically thermoset matrices are toughened by the addition of a second polymer such as an elastomeric or thermoplastic additive. Phase separation of the second polymer from the matrix polymer introduces toughening mechanisms that improve fracture toughness. Epoxy resins modified with the addition of rubbers are one such example of this. The addition of a rubber to a matrix has however been found to reduce matrix modulus, yield strength and glass transition temperature. This approach to toughening is therefore unsuitable for many applications where high strength is required. The addition of certain thermoplastics can provide similar toughening but with a minimal reduction of the mechanical properties that are otherwise degraded by rubber. Soluble thermoplastics can be added to the matrix which phase separate during cure, or insoluble particles can be added which remain in a separate phase throughout processing. It is believed that the separate thermoplastic phase in the cured matrix acts to toughen the matrix through a variety of proposed mechanisms, including crack path deflection, particle yielding, shear banding, crack bridging, crack pinning and micro cracking.

The addition of any particulate additive to a matrix e.g. a toughener or a conductive particle, has the undesirable effect of increasing the viscosity of the matrix. A high matrix viscosity presents numerous processing difficulties. It is therefore necessary for a matrix comprising particulate additives to be heated to reduce its viscosity during various stages of processing.

The high temperatures required to process the resin composition can often exceed the melting point of the additives. Where the additives comprise thermoplastic toughening particles, the result is an undesirable melting of the particles. The particles can then agglomerate or deform, impairing their ability to toughen the host matrix. The same effect may also occur during exothermic cure of the matrix. One solution to this is to use thermoplastic particles with a higher melting point but these do not tend to provide optimal toughening. Alternatively lower temperatures and lower process rates can be used, but this results in a decrease of line speed and rate of production.

Electrical conductivity is a desirable characteristic of a composite material used in aerospace and wind energy applications. It is particularly important for a composite material to possess a suitable level of conductivity in applications that may be vulnerable to lightning strike. The addition of thermoplastic tougheners to composite materials also results in an undesirable decrease of electrical conductivity. A thermoplastic toughener that retains matrix conductivity is therefore highly desirable.

Particular additives are not typically used in composite materials made by RTM because their flow is impeded by the reinforcement fibres and they become unevenly distributed throughout the cured composite. Instead, a common way of toughening infused composite materials is to place a thermoplastic non-woven fabric in the form of a veil between the fibre layers in the mould before the resin is infused. During cure the heat can cause the veil to melt and lose its structure. This can result in an undesirable reduction of toughening because the veil melts into irregular shapes and flows into the fibrous reinforcement tows. These irregular shapes can also be mistaken for defects during NDT inspection, sometimes leading to accidental scrapping of a composite part. The term "veil" is used to describe a thin lightweight porous web or fibrous reinforcement having a weight in the range of from 0.5 to 30 g/m2 (gsm), preferably from 1 to 25 gsm, and more preferably from 1 to 10 gsm, and even more preferably from 1 to 8 gsm and/or or combinations of the aforesaid weight ranges which allows liquid resin to pass therethrough, typically it is fibrous and also it is preferably derived from a polyamide.

The present invention aims to overcome the above described problems and/or to provide improvements generally.

SUMMARY OF THE INVENTION

According to the present invention, there is provided an additive for a thermoset matrix, a method for making an additive, a prepreg or a cured laminate and a method of making a prepreg as defined in any one of the accompanying claims.

In an aspect of the present invention, there is an additive for a thermoset resin matrix having a core and a cross-linked thermoset coating, wherein the cross-linked thermoset coating is the reaction product of a thermoset resin and a curative in a dispersant.

Another aspect of the invention is a method of making an additive for a thermoset resin comprising the steps of:
 a) adding a core material to a dispersant
 b) adding a thermoset resin and a curing agent to the dispersant c) reacting the thermoset resin and the curing agent, until a reactive cross-linked thermoset coating is formed on the core material.

In an embodiment of the present invention the coating encapsulates a core material, also referred to as a substrate. The coating is formed from the reaction product of the thermoset resin and curing agent which precipitate out of solution from a dispersant onto the surface of the core. Preferably, the additives are produced in the same vessel as the dispersion. Preferably the coating is at least partially cured, most preferably it is fully cured.

The additives can be incorporated into a composite material comprising structural fibres and a thermoset resin. Beneficially, the reactive cross-linked thermoset coating provides the core material with improved resistance to deformation or coalescing when exposed to the high temperatures used during processing or cure. This is because the coating of the invention encapsulates or coats the core material, preventing it from deforming, flowing or agglomerating when process temperatures close to the melting point of the core are used. This is particularly relevant where the additive has a low melting point, e.g. polyamides such as PA11, PA 12, or the matrix has a high cure temperature, e.g. epoxy, BMI or polyimide resins. Furthermore, additives with exceptionally low melting points which melt or dissolve too readily to be considered for use in conventional composite materials may now be considered when used in accordance with the present invention. In addition, additives of the present invention comprising a core that would be soluble in a host matrix can be prevented from dissolving in the host matrix by the coating and they remain present in the matrix as a separate phase.

The thermoset matrices typically used in composite materials differ in their chemistry to the thermoplastic additives used to toughen such materials; as such they remain in two separate phases in the cured material. This results in a weak interface between the two different phases. Whilst in part, this interface is responsible for improving toughness, it is also attributed to degradation of other properties of the laminate. An object of the present invention is to improve the interface between an additive and the thermoset matrix to reduce this degradation of properties.

Embodiments of the present invention provide an additive to a resin matrix that is encapsulated with a cross linked polymer coating, where the cross linked polymer is the same as, or compatible with, the chemistry of the host matrix resin. The coating can be formed so that the reactive groups are present on its surface. This can be controlled by adjusting the ratio of reactant in the dispersion. Reactive groups on the surface of the coating become incorporated into the inter-polymer network of the host matrix, thereby improving the bond strength between additive and matrix. Embodiments of the present invention allow for control of the interface between additive and matrix to achieve optimum properties by altering the type and number of reactive groups present on the surface of the additive. An improved bond between additive and matrix requires greater energy to break and can improve toughness.

It is believed that the bond between the core material and the coating is also improved, because the cross linked coating forms on the core by precipitating from a low viscosity solution in a reaction that is chemically and thermodynamically favourable. Other methods of coating, for example by melting a coating use high viscosity mediums to coat and are not as chemically favourable.

In embodiments of the present invention cross linked polymer coating may comprise a thermally or electrically conductive additive such as carbon black, carbon nanoparticles and/or combinations thereof. The conductive additive may comprise an average diameter in the range of from 0.0005 to 1 µm, preferably from 0.001 to 0.5 µm, more preferably from 0.005 to 0.2 µm, even more preferably from 0.01 to 0.1 µm and/or combinations of the aforesaid ranges. This can be achieved by adding the conductive component to the dispersion with the reactants; it then becomes incorporated into the coating. Thus a toughener can be produced that also provides improved conductivity without the viscosity increase that occurs when a separate toughener and conductivity particle is added to the matrix. This also has the benefit that conductivity is added directly to the surface of the toughener.

Another aspect of the invention is a method for making a prepreg with an additive of the present invention comprising the following steps in any order:
a) adding the additive to a thermoset resin matrix;
b) heating the thermoset resin matrix resin, and;
c) impregnating reinforcement fibres with the resin matrix.

In a preferred embodiment of the method of making a prepreg, the resin is heated to a temperature greater than the melting temperature of the core material of the additive.

Additives are commonly used to improve matrix properties such as conductivity, tack, viscosity or toughness. Any additive for a matrix is suitable for use in modifying a property of a matrix can be used as the core material. This may include for example ceramics and minerals such as silica or titanium oxide, polymers, metals, carbon derived materials, fibres, veils or fabrics.

Additives of the present invention can be used to improve toughness by incorporating the additive into the interlayer of a composite material. Any thermoplastic substance which is commonly used as a toughener in composite materials is therefore suitable as the core material in the present invention. Suitable toughening agents include polymers which can be in the form of homopolymers, copolymers, block copolymers, graft copolymers, or terpolymers. The thermoplastic toughening agents are thermoplastic resins having single or multiple bonds selected from carbon-carbon bonds, carbon-oxygen bonds, carbon-nitrogen bonds, silicon-oxygen bonds, and carbon-sulphur bonds. One or more repeat units may be present in the polymer which incorporate the following moieties into either the main polymer backbone or to side chains pendant to the main polymer backbone: amide moieties, imide moieties, ester moieties, ether moieties, carbonate moieties, urethane moieties, thioether moieties, sulphone moieties and carbonyl moieties. The thermoplastic polymer may be either crystalline or amorphous or partially crystalline.

The thermoplastic polymer may be selected from: polyamides (PA: e.g. PA 6, PA 12, PA 11, PA 6-6, PA 6-10, PA 10-10, PA 6-12, etc.), copolyamides (CoPA, copolymers of one or more of the aforesaid polyamides), block ether or ester polyamides (PEBAX, PEBA), polyphthalamides (PPA), polyesters, (polyethylene terephthalate-PET-, polybutylene terephthalate—PBT etc.), copolyesters (CoPE), polyurethanes (PU), polyacetals (POM, etc.), polyolefins (PP, HDPE, LDPE, LLDPE etc.), polyethersulfones (PES), polysulfones (PSU etc.), polyphenylene sulfones (PPSU etc.), polyetheretherketones (PEEK), polyetherketoneketone (PEKK), poly (phenylene sulfide) (PPS), or polyetherimides (PEI), thermoplastic polyimides, liquid crystal polymers (LCP), phenoxys, block copolymers such as styrene-butadiene-methylmethacrylate copolymers (SBM), methylmethacrylate-butyl acrylate-methylmethacrylate copolymers (MAM), epoxies, and mixtures thereof.

In a preferred embodiment the core material comprises polyamide and/or copolyamide. Particles made from polyamides and/or copolyamides have been a used as interleaf toughening particles in the past (See U.S. Pat. No. 7,754,322 and published U.S. Patent Application No. 2010/0178487A1, both incorporated herein by reference). Polyamides come in a variety of types, such as polycaprolactam (PA 6), polylaurolactam (PA 12), copolymers of PA 6 and PA 12, as well as PA 10 and Rilsan (PA 11). Any of the polyamides that are suitable for toughening thermoset matrices are suitable for use as the core in the present invention.

The core may be in the form of a fibre, particle, or a structured layer (e.g. scrim or veil) or a nonwoven layer.

Where a particle is used as the core, the particle shape may be spherical, non-spherical, porous, spicular, whiskerlike or in the shape of flakes. A spherical core material is preferred because it is easier to impregnate into the matrix resin of a prepreg as it has a smaller effect on flow properties of the matrix resin. Preferably the particulate is of the nano or micro scale, in particular between 0.001 µm and 500 µm, preferably between 0.05 µm and 100 µm, preferably between 5 and 60 µm, more preferably between 10 µm and 30 µm and/or combinations of the aforesaid ranges. The particle size may be determined by any of the variety of standard methods, such as by use of a Coulter counter or "Multisizer" apparatus, or by a Granulometer device.

Orgasol 1002 D NAT1 is an example of a suitable polyamide particulate core material. Orgasol 1002 D NAT1 is composed of 100% PA6. The Young's modulus of Orgasol 1002 D NAT1 particles is about 300 ksi. The particles having a degree of crystallinity equal to 51%, a glass transition temperature (Tg) of 26° C., a density of 1.15 (ISO 1183), a molecular weight of 60,200 (g/mole) with a melting point of 217° C. and an average particle size of 20 µm. Another example of a suitable rigid particle is Orgasol 3202 D Nat 1 which contains PA6/PA12 copolymer particles (80% PA 6 and 20% PA 12) having a degree of crystallinity equal to 43%, a Tg of 29° C., a density of 1.09 (ISO 1183), a molecular weight of 60,800 (g/mole). The polyamide copolymer particles in Orgasol 3202 D Nat 1 have an average particle size of 20 µm and a melting point of 194° C. The amount of PA 12 in the copolymer may be increased above 20%.

Polyamide particles come in a variety of grades that have different melting temperature ranges depending upon the particular polyamide and the molecular weight of the polyamide. Polyamide particles in accordance with the present invention have melting temperature ranges of above 150° C. and below 240° C. It is preferred that the polyamide particles have a Young's modulus of between 200 and 400 ksi with a modulus of about 300 ksi being particularly preferred.

One advantageous aspect of the present invention is that the coating is capable of encapsulating the core material, therefore any pores in the material will become encapsulated. A porous additive introduces voids into the host matrix, such voids cause an undesirable reduction of mechanical properties in the resin matrix. The present invention coats any pores on the core material enabling the use of materials which would otherwise not be considered suitable for use in a matrix. One example of this is the use of certain PEEK particles as a toughener, normally considered too porous for use in a matrix.

Where the core material is in the form of a fibre, both long and short fibres can be used. JP-02-69566A (herein incorporated by reference) demonstrates an applicable method in which short fibres are used to toughen in a similar manner to particles. Short fibres can also be processed into a mat or veil, preferably the short fibres comprise a thermoplastic material. An example of long fibres for toughening a composite is given in JP-04-292634A (herein incorporated by reference), where they are arranged in parallel on the surface of a prepreg, they may also be woven into the fabric of the reinforcement in a prepreg. A method where fibres are arranged randomly and used to toughen a prepreg is disclosed in WO94/016003 (herein incorporated by reference). All of the above materials are examples of materials suitable for use as the core in the present invention. Both long or short fibres can be arranged as a sheet-like base material such as a woven fabric, a non-woven fabric, a knitted fabric, a short fibre chip, a chopped strand or a milled fibre mat all of which are suitable for use as the core material. Short fibres which are made into a spun yarn and arranged in parallel or random, or processed into a woven fabric or a knitted fabric can also be employed.

Where a structured thermoplastic layer is used as a core material, the layer is preferably in a physical form that allows it to be substituted in place of particles in the interleaf zone. In particular, the layers must preferably be sufficiently thin to fit within the interleaf zone and the density of the layer must be such that the appropriate amount or concentration of thermoplastic material is present in the interleaf zone to impart the desired amount of damage tolerance. Interleaf zones in cured high strength structural laminates typically have a thickness that ranges from 10 to 100 µm. Preferred interleaf zones range in mean thickness from 15 µm to 50 µm.

The density of the structured thermoplastic core preferably provides the desired amount (concentration) of thermoplastic toughener to the interleaf zone. The required density for the layer is directly dependent upon the thickness of the layer being used. The thinner the layer, the denser the layer must be in order to provide the same concentration of thermoplastic toughener in the interleaf zone. The density of the structured thermoplastic layer should be such that it provides a structured layer that has an areal weight of 1 to 100 g/m$^2$ (gsm) for layers that range from 0.5 to 50 µm in thickness. For preferred thermoplastic layers that are 2 to 35 µm thick, it is preferred that the density of the thermoplastic layer be such that the areal weight of the layer is from 2 gsm to 10 gsm. For layers that are from 3 to 20 µm thick, the density of the layer should be such that the areal weight of the layer is from 2 gsm to 8 gsm.

Structured thermoplastic cores having the required combination of thickness and areal weight are available commercially in the form of spunlaced and random fibrous veils. An exemplary lightweight (4 gsm) fibrous veil is available as 128D04 Nylon veil from Protechnic (Cernay, France), this veil is made from randomly oriented PA 12 fibres. Another suitable nylon veil is 128D06 nylon veil, which is a 6 gsm PA 12 fibrous veil that is also available from Protechnic.

The core may also comprise any rubber particle which is known for use as a toughening agent. Particulate rubbers employed in the practice of this invention may be characterized as those comprising rubber particles, including for example carboxylated rubber, styrene rubbers polyurethane elastomers, butyl rubbers, isobutadienes, and more particularly as being a finely-divided, cross-linked rubber. Core shell rubber particles for example those in Kaneka MX717 are particularly suited for use as the core. Nanoscale rubbers are incompatible with PES toughened matrices. Advantageously, if such particles are used as the core material in accordance with the present invention, the coating of the present invention improves their compatibility in a PES toughened matrix.

Hollow microspheres may also be used as the core material. Hollow microspheres are frequently used within composite materials as an additive to reduce the density. During processing of a resin containing microsphere, low shear mixing is required to prevent breakage of the fragile micro particles. By encapsulating the microspheres the cross-linked polymer shell increases the particles' ability to withstand shear during mixing. This means that faster mixing rates and conventional equipment may be used, which reduces processing costs. Suitable hollow microspheres are commercially available in a variety of sizes, materials, and properties. Examples of some existing hollow microspheres useable with the present invention are available from 3M™ and Zeelan Industries, Inc. under the trade names 3M™ Scotchlight™ glass bubbles, 3M™ Scotchlight™ glass bubbles floated series, 3M™ Z-Light™ Spheres microspheres, and 3M™ Zeeospheres™ microspheres. The microspheres can be made from a variety of materials, for example glass, ceramic, or plastic.

The core material may comprise a conductive particle comprising carbon or a metal. Such particles are commonly added to matrices to improve thermal or electrical conductivity. By applying a coating of the present invention to such particles, integration into the host matrix can be improved. This may result in a reduction of any adverse effect on mechanical properties that uncoated particles may have otherwise caused.

The additives of the present invention can be made using a wide range of particulates as the core material, for example, minerals, metals and carbon derivatives can all be used. Specific examples of these include silica, zinc oxide, PTFE, silicone, titanium dioxide, potato shaped graphite and silver nanoparticles.

In an embodiment of the invention the core comprises a material with a melting point between of at least 50° C. and 250° C., or preferably between 100° C. and 225° C., or more preferably between 150 and 200° C., or more preferably still between 170 and 200° C. and/or combinations of the aforesaid ranges.

Suitable polyamide particles contain polyamide 6 (polycaprolactam PA 6) as the main ingredient, but may also contain minor amounts of polyamide 12 (polylaurolactam PA 12) and/or polyamide 11. The particles should have particle sizes of below 100 µm. It is preferred that the particles range in size from 5 to 60 µm and more preferably from 10 to 30 µm. It is preferred that the average particle size be around 20 µm. The particles may be substantially spherical. The particles can be made by anionic polymerization in accordance with PCT application WO2006/051222, by co-extrusion, precipitation polymerization, emulsion polymerization or by cryogenic grinding. Suitable polyamide particles are available commercially from Arkema of France under the trade name Orgasol.

In an embodiment of the present invention, the cross-linked polymer coating has reactive groups on its surface derived from either the curing agent or the resin or both. In an embodiment of the present invention, the thermoset resin is an epoxy resin and the curing agent is an amine, and the surface reactive group or either predominantly epoxy or amine groups, or a combination of both.

The coating is produced by providing a dispersion comprising a dispersant, the thermoset resin, the curing agent and the core material, and reacting the resin and curing agent to deposit a cross-linked polymer on the surface of the core material. In an embodiment of the present invention the dispersant is polypropylene glycol. Preferably the dispersant is polymer that is liquid at room temperature (typically 25° C.), more preferably it is a polyether. In an embodiment the thermoset resin is an epoxy and the curing agent is an amine. Preferably the core material is a thermoplastic particle or veil.

In a preferred embodiment of the invention the thermosetting resin is an epoxy resin. A wide variety of epoxy resins are useful for the purpose of the present disclosure. Epoxy resins are organic materials having an average of at least 1.5, generally at least 2, reactive 1,2-epoxy groups per molecule. These epoxy resins can have an average of up to 6, preferably up to 4, most preferably up to 3, reactive 1,2-epoxy groups per molecule. These epoxy resins can be monomeric or polymeric, saturated or unsaturated, aliphatic, cycloaliphatic, aromatic or heterocyclic and may be substituted, if desired, with other substituents in addition to the epoxy groups, e.g. hydroxyl groups, alkoxy groups or halogen atoms.

Suitable examples include epoxy resins from the reaction of polyphenols and epihalohydrins, poly alcohols and epihalohydrins, amines and epihalohydrins, sulfur-containing compounds and epihalohydrins, polycarboxylic acids and epihalohydrins, polyisocyanates and 2,3-epoxy-1-propanol (glycidyl) and from epoxidation of olefinically unsaturated compounds.

Preferred epoxy resins are the reaction products of polyphenols and epihalohydrins, of polyalcohols and epihalohydrins or of polycarboxylic acids and epihalohydrins. Mixtures of polyphenols, polyalcohols, amines, sulfur-containing compounds, polycarboxylic acids and/or polyisocyanates can also be reacted with epihalohydrins. Illustrative examples of epoxy resins useful herein are described in The Handbook of Epoxy Resins by H. Lee and K. Neville, published in 1967 by McGraw-Hill, New York, in appendix 4-1, pages 4-56, which is incorporated herein by reference.

The epoxy resin may comprise an average epoxy equivalent weight (EEW) in the range of from 40 to 2000, preferably from 40 to 1500, more preferably from 40 to 1000, and even more preferably from 50 to 300 and/or combinations of the aforesaid ranges. The average EEW is the average molecular weight of the resin divided by the number of epoxy groups per molecule. The molecular weight is a weight average molecular weight.

For difunctional epoxy resins the average epoxy equivalent weight is advantageously from about 170 up to about 3000, preferably from about 170 up to about 1500.

Preferred examples of epoxy resins are those having an average epoxy equivalent weight of from about 50 to about 300. Such resins are commercially available from The Dow Chemical Company, as D.E.R. 330, D.E.R. 331 and D.E.R. 332 epoxy resins. Further preferred examples are resins with higher epoxide equivalent weight, such as D.E.R. 667, D.E.R. 669 and D.E.R. 732, all of which are commercially available from The Dow Chemical Company, or Araldite MY0610, MY0600, MY721, LY1556, EPN1179 or MY0510 all of which are available from Huntsman.

Another class of polymeric epoxy resins which are useful for the purpose of the present disclosure includes the epoxy novolac resins. The epoxy novolac resins can be obtained by reacting, preferably in the presence of a basic catalyst, e.g. sodium or potassium hydroxide, an epihalohydrin, such as epichlorohydrin, with the resinous condensate of an aldehyde, e.g. formaldehyde, and either a monohydric phenol, e.g. phenol itself, or a polyhydric phenol. Further details concerning the nature and preparation of these epoxy novolac resins can be obtained in Lee, H. and Neville, K.; Handbook of Epoxy Resins, McGraw Hill Book Co. New York, 1967, the teaching of which is included herein by reference. Other useful epoxy novolac resins include those commercially available from The Dow Chemical Company as D.E.N. 431, D.E.N. 438 and D.E.N. 439 resins, respectively.

In alternative embodiments any resin from the following classes may also be used as the thermoset resin: benzoxazine resins, vinyl ester resins, unsaturated polyester resins, urethane resins, phenol resins, melamine resins, maleimide resins, cyanate resins and urea resins.

The curative used to form the reactive cross-linked thermoset coating needs to be compatible with the resin selected to form the coating. Any curative that is compatible with the selected resin may be used. In a preferred embodiment the curing agent is an amine curing agent. A variety of amine curing agents can be used in preparing the cross-linked polymer coating of the present invention. The amine curing agents which may be employed are primarily the multifunctional, preferably di- to hexafunctional, and particularly di- to tetrafunctional primary amines. Examples of such amine curing agents include, but are not limited to, isophorone diamine (IPDA), ethylene diamine, tetraethylene amine, 2,4-diaminotoluene (DAT), diamines (for example, diaminodiphenyl sulfones or diaminocyclohexane) and dicyandiamide (DICY). Mixtures of two or more of the amine curing agents can also be used. Also modified hardeners where amines are reacted in vast excess with epoxy resin are good candidates as amine curing agents.

In an embodiment of the invention the cross-linked reactive thermoset coating comprises a property modifier. The property modifier may be any additive that is used to modify the properties of a thermoset polymer. This includes for example conductive particles, viscosity modifiers, and toughening agents. Examples of suitable conductive particles include carbon black, carbon nano tubes, graphite and other conductive carbon derivatives, metal flakes, metallic nano particles and other metallic conductive particles. The property modifiers can be incorporated into the coating by including them in the dispersion before reacting. As discussed above, the addition of a conductive particle to a conventional resin matrix increases matrix viscosity creating processing difficulties. These difficulties are increased further when the matrix already contains toughening additives; this limits the quantity of conductive particle that can be added to a matrix.

In an embodiment of the present invention, an additive comprises a toughening core and a conductive coating containing a conductive property modifier. Advantageously the use of this additive in a matrix provides improved conductivity and toughness in the same additive without the undesirable increase of viscosity that would occur with two separate additives. This also has the benefit that conductivity is added directly to the surface of the toughener. Tougheners significantly reduce the conductivity of a matrix therefore it is beneficial to provide a conductive around the surface of toughener.

Preferably the property modifier is added to the dispersant between 0.001 and 25 weight percent of the dispersion, more preferably between 0.01 and 20 weight percent, more preferably between 0.1 and 15 weight percent, more preferably still between 1 and 10 weight percent. The property modifier may be added to the dispersion at a ratio of from 0.2 to 200:1 to the combined content of resin and curing agent, or more preferably from 0.5 to 100:1, more preferably still from 1 to 50:1. A property modifier may have an average diameter in the range of from 0.0005 to 1 µm, preferably from 0.001 to 0.5 µm, more preferably from 0.005 to 0.2 µm, even more preferably from 0.01 to 0.1 µm and/or combinations of the aforesaid ranges It is also possible to use an accelerator in forming the reactive cross-linked thermoset coating of the present disclosure. Such accelerators are known in the art. Suitable accelerators are, for example, amines, preferably ethylene diamine, diethylene triamine, triethylene tetraamine, aminoethyl piperazine, organic acids, e.g. dicarboxylic acids, phenol compounds, imidazole and its derivatives, urea based curing agents such as 2,4 toluenebisdimethylurea, 2,6 toluenebisdimethylurea, those under the commercial name Urone® and calcium nitrate. For the various embodiments, the choice of the reaction temperature, the dispersant and the amine curing agent, as provided herein, influence the solubility of the cross-linked polymer. These choices allow for a phase separation of the cross-linked polymer from the dispersant to occur before a significant amount of the dispersant has an opportunity to react with either of the curing agent and/or the resin. For example, with a rapid phase separation of the cross-linked polymer due to the choice of reaction temperature, curing agent, and the solubility parameters of the dispersant, the opportunity for the dispersant to react with the resin can be greatly reduced. In other words, the less solubility the cross-linked reactive polymer has at a given reaction temperature and time, the less likely it is react or interact with the dispersant. It is appreciated that not all dispersant reacts with the epoxy and/or amine groups, where most dispersants do not react at all.

The reactive cross-linked thermoset shell of the present invention can be fully integrated (e.g., covalently integrated) in the curable epoxy system network because it exhibits unreacted amine and/or epoxy groups present on its surface and/or within the shell. For example, the reactive groups can interact with the curable epoxy system network via surface active groups or within its volume if the shell is swollen by formulation ingredients and is not fully cross-linked. Thus the coating can improve the integration of an additive of the present invention compared to the core in an uncoated form. If the compositions of both the coating and the host matrix are identical, the integration can be full without identifiable interfaces being present.

The additives of the present invention can be fully integrated into a host matrix by virtue of unreacted groups present on or in the reactive cross-linked thermoset coating of the additive. If the thermoset coating is formed from the same or similar reactants to the host matrix then the coating of the additives can react covalently with the matrix leaving no identifiable interface between the perimeter of the shell and the matrix. The presence of reactive groups on or in the reactive cross-linked coating is dependent on the reaction conditions and the molar ratio of curing agent to epoxy resin.

The presence of reactive epoxy groups on or in the coating of an additive of the present invention can be determined by combining with a curing agent (e.g. 4,4'-DDS) and performing differential scanning calorimetry (DSC) on the composition. Likewise, if the additive exhibits a surplus of amine groups then it should be combined with an epoxy resin (e.g. LY3581 or MY0610). Additives of the present invention will exhibit exothermic behavior when reacted with either a curative or resin, this can be detected using scanning differential calorimetry. Therefore, the term reactive refers to the presence of unreacted groups derived from either the resin or curing agent on or in the coating of the additive.

The reactive cross-linked thermoset coating which comprises part of the additive of the present invention can be the reaction product of at least one thermoset resin and at least one curing agent in the presence of a dispersant, where the reaction conditions (e.g. reaction temperature, reaction time, resin to curative ratio, among others) allow for the coating to be deposited by phase separating onto the surface of the core material in a non-agglomerated form with little or no dispersant bound to the cross-linked reactive thermoset coating.

The cross-linked reactive thermoset coating can be produced by reacting the thermoset resin with the curing agent in the dispersant containing the core material. The reaction can proceed without stirring and, depending on the choice of the resin, the curing agent and/or the dispersant, at a point along the reaction, a phase separation occurs in which the cross-linked thermoset coating is preferentially precipitated onto the surface of the core material to form a coating. Parameters that potentially have an influence on the structure (e.g. the thickness of the coating, the surface chemistry, and the Tg of the coating, among others), the phase separation of the cross-linked thermoset coating include the concentration of the reactants dissolved (expressed as a weight percent of the reactant); the curative/resin molar ratio; the reaction temperature and time; the dispersant (in particular viscosity and molecular weight) and the chemical structure of the resin and curing agent.

Additives of the present invention include a core material coated with a reactive cross-linked thermoset coating that is a reaction product of the resin and the curing agent reacted in the dispersant at a temperature of 20° C. to 200° C. during which the cross-linked reactive thermoset coating phase separate onto the core material from the dispersant. Preferably the reaction takes place at a temperature of between 100° C. and 190° C., most preferably between 150° C. and 180° C. If the reaction is heated by an oven, hotplate or similar then the reaction will have achieved at least 95% of the full yield within 24 hours, preferably within 10 hours and more preferably within 7 hours, and most preferably within 4.5 hours. Preferably, the reaction time is between 3 and 7 hours when heated with an oven or similar. The reaction time depends on the temperature, the amine/epoxy molar ratio; the dispersant, the use of a catalyst and the chemical structure of the epoxy resins and the curing agent. Preferably the reaction time when heated by a microwave is in the range of from 1 second to 3 hours, or more preferably between 10 seconds and 1 hour, or more preferably still between 30 seconds and 20 minutes.

The reaction times are a function of, amongst others, the temperature, the amine/epoxy molar ratio; the dispersant, the use of a catalyst, the chemical structure of the resins and the curing agent. When using polyamines as the amine curing agent, for instance, the rate of the polyaddition reaction can be influenced by the amine's basicity as well as by steric factors.

In embodiments of the present invention the dispersant can be bound to the surface of the reactive cross-linked thermoset shell at a concentration of no greater than 0.001 weight percent based on the weight of the additive. So, the dispersant bound (e.g. absorbed) to the reactive cross-linked thermoset coating is no greater than 0.001 weight percent based on the total weight of the additive.

For all embodiments, additives of the present invention can be formed via precipitation polymerization process without the use of a surfactant. Precipitation polymerization is a polymerization process that begins initially with the monomers (e.g. epoxy resin and amine curing agent) in solution in the dispersant, but upon initiation the formed cross-linked thermoset matrix becomes insoluble and precipitates. Without wishing to be bound by theory it is believed the cross-linked thermoset matrix preferentially precipitates on to the surface of the core material because it provides lower surface energy, thus a coating is formed around the core. Precipitation polymerization allows the reactive cross-linked thermoset coating to be formed in a nanometer to micron thickness range. The reactive cross-linked coating of the additive of the present invention can be produced via the precipitation polymerization method without the need for the use of a surfactant. The precipitation polymerization to produce the coating of the present invention can proceed without the need to provide agitation. In addition, it can be performed in a batch process, preferably in a single container, or in a continuous process where the reaction preferably occurs within a silicone or glass tube.

The cross-linked reactive polymer coating of the present invention is less likely to form an interface, as discussed herein, with the curable resin matrix as there is no surfactant on the surface of the coating. For the various embodiments, no surfactant is present on the surface of the coating because no surfactant is used in producing the cross-linked reactive polymer coating.

For the precipitation polymerization, the dispersant can be either a neat solvent or a mixture of solvents, as long as the solubility parameters of the dispersant can be matched to those of the resin and curative monomers so as to provide a phase separation of the reactive cross-linked thermoset coating. For the various embodiments, a variety of dispersants can be used in the dispersion polymerization of the present disclosure. Preferably the dispersion is a liquid polymer. For example, the dispersant can be selected from the group consisting of polyethers (e.g. polypropylene glycol (PPG) and/or polyisobutylene ether), poly(oxypropylene), polyethylene glycol (PEG), polypropylene oxide, polybutylene oxide, aliphatic ketone, cyclic ketone such as cyclohexane and/or cyclohexanone, and combinations thereof. Preferably, the dispersant is polypropylene glycol. Preferably the dispersant has a molecular weight between 400 and 20,000 g/mol, or between 600 to 5000 g/mol, or between 800 to 1500 g/mol, or between 900-1200 g/mol, and/or combinations of the aforesaid ranges.

Neat particles of cured resin can also be produced by using a dispersion as described above that is free from a core material. Instead of depositing a cured thermoplastic coating onto a core material, neat particles with a very narrow monomodal size distribution precipitate out of solution during cure. The size of these neat particles can be controlled by changing the molecular weight of the dispersant, a higher molecular weight dispersant will produce smaller particles. Poly propylene glycol (PPG) is only available with a molecular weight up to about 4000 g/mol, polyethylene glycol (PEG), which is similar to PPG is available up to 10,000 g/mol but does not produce particles when high molecular weights are used. Surprisingly, the use of a high molecular weight triblock copolymer of PPG and PEG does however allow small particles with sizings from 0.2 to 0.5 µm to be produced. A PEG-PPG-PEG copolymer is preferred for obtaining smaller sized beads.

Particles produced by this route can be used as property modifying additives for a matrix, or they can be used as a core material to receive a subsequent coating. This gives greater scope to the properties that can be altered by additives of the present invention.

For the various embodiments, a nonsolvent can also be used with the dispersant. Examples of suitable nonsolvents include, but are not limited to, alkenes (either aliphatic (dodecane) or cyclic), aromatic alkene, orthopthalates, alkyl azelates, other alkyl capped-esters and ethers, and combinations thereof.

The additives of the present invention can be produced by dissolving the resins and the curing agent in the dispersant such that the resin and curing agent combined have a concentration in the dispersant of 0.01 to 50 weight percent (wt %) based on the total weight of the dispersion, i.e. the dispersant, the resin and the curing agent and the core material. Preferably, the resin and the curing agent have a combined concentration in the dispersion of 0.05 to 30 weight percent, more preferably between 0.01 and 10 weight percent, most preferably, the resins and the curing agent in the dispersion have a combined concentration in the dispersion of 0.1 to 10 weight percent based on the total weight of the dispersion.

To produce an additive of the present invention with the majority of groups derived from the resin component on the surface, the dispersion will preferably contain a weight ratio of resin to curative between 10:1 and 1.01:1, or more preferably between 5:1 and 2:1. To produce an encapsulated particle with the majority of groups derived from the curing agent on the surface, the dispersion will preferably contain a weight ratio of resin to curative between 1:10 and 1:1.01, or more preferably between 1:5 and 1:2. Alternatively a stoichiometric ratio can be used to produce an even number of surface reactive groups derived from the resin and curative.

The resin and the curing agent can be dissolved individually or together in the dispersant. The core material is also added to the dispersion, preferably between 0.001 and 60 weight percent of the dispersion, more preferably between 0.01 and 40 weight percent of the dispersion, more preferably between 0.02 and 20 weight percent of the dispersion, or more preferably still, between 0.1 and 8 weight percent of the dispersion, and/or combinations of the aforesaid ranges.

In a preferred embodiment the dispersion contains a ratio of substrate to resin and curative reactants of from 20:1 to 0.01:1, or more preferably from 10:1 to 1:1, and more preferably still from 5:1 to 2:1.

Additives of the present invention can be incorporated into a host resin matrix which can be combined with a fibrous reinforcement to form a prepreg. The resin matrix is made in accordance with standard prepreg matrix processing methods. In general, various resins, typically epoxies are mixed together at room temperature to form a resin mix to which the additive is added.

The matrix resin containing the additives of the invention is applied to the fibrous reinforcement in accordance with any of the known prepreg manufacturing techniques. The fibrous reinforcement may be fully or partially impregnated with the matrix resin. In an alternative embodiment, the matrix resin may be applied to the fibrous reinforcement as a separate layer, which is proximal to, and in contact with, the fibrous reinforcement, but does not substantially impregnate the fibrous reinforcement. The prepreg is typically covered on both sides with a protective film and rolled up for storage and shipment at temperatures that are typically kept well below room temperature to avoid premature curing. Any the other known prepreg manufacturing processes and storage/shipping systems may be used if desired.

The fibrous reinforcement of the prepreg may be selected from hybrid or mixed fibre systems that comprise synthetic or natural fibres, or a combination thereof. The fibrous reinforcement may preferably be selected from any suitable material such as fiberglass, carbon or aramid (aromatic polyamide) fibres. The fibrous reinforcement is preferably carbon fibre.

The fibrous reinforcement may comprise cracked (i.e. stretch-broken) or selectively discontinuous fibres, or continuous fibres. It is envisaged that use of cracked or selectively discontinuous fibres may facilitate lay-up of the composite material prior to being fully cured, and improve its capability of being shaped. The fibrous reinforcement may be in a woven, non-crimped, non-woven, unidirectional, or multi-axial textile structure form, such as quasi-isotropic chopped prepreg. The woven form may be selected from a plain, satin, or twill weave style. The non-crimped and multi-axial forms may have a number of plies and fibre orientations. Such styles and forms are well known in the composite reinforcement field, and are commercially available from a number of companies, including Hexcel Reinforcements (Les Avenieres, France).

The prepreg may be in the form of continuous tapes, towpregs, webs, or chopped lengths (chopping and slitting operations may be carried out at any point after impregnation). The prepreg may be an adhesive or surfacing film and may additionally have embedded carriers in various forms both woven, knitted, and non-woven. The prepreg may be fully or only partially impregnated, for example, to facilitate air removal during curing.

The prepreg may be moulded using any of the standard techniques used to form composite parts. Typically, one or more layers of prepreg are placed in a suitable mould and cured to form the final composite part. The prepreg of the invention may be fully or partially cured using any suitable temperature, pressure, and time conditions known in the art. Typically, the prepreg will be cured in an autoclave at temperatures of between 120° C. and 190° C. The composite material may also be cured using a method selected from UV-visible radiation, microwave radiation, electron beam, out of autoclave cure, gamma radiation, or other suitable thermal or non-thermal radiation.

Composite parts made from the improved prepreg of the present invention will find application in making articles such as primary and secondary aerospace structures (wings, fuselages, bulkheads and the like), but will also be useful in many other high performance composite applications including automotive, rail and marine applications where high tensile strength, compressive strength, interlaminar fracture toughness and resistance to impact damage are needed.

In RTM, an infusible structure (or preform) is made from reinforcing fibres and other additives including binders, and the preform is injected or infused with liquid resin and cured at an elevated temperature to form a laminate. It is very difficult to toughen RTM resins because the addition of thermoplastics increases resin viscosity. This can make it impossible to inject the resin into a large part, because the resin begins to cure before the preform is completely filled with resin. Additionally, if the thermoplastic or rubber toughening agent is dispersed into the resin in the form of undissolved particles, these particles are then filtered by the fibre preform, resulting in a concentration gradient of the toughener, or in fact completely blocking further injection/infusion of resin.

Structured layers which are coated in accordance with the present invention are ideally suited for use with dry fibre preforms. They can be used as a substitute for thermoplastic interleaf toughening particles, also provide an effective means for holding unidirectional fibre layers together during handling prior to resin infusion. The coated fibrous veils function both as a temporary holding system for the unidirectional fibres and as thermoplastic toughening agent for the cured laminate. Their coating prevents them from losing their structure from melting during the resin cure cycle.

In the case of RTM, processes, assemblies are prepared by applying the additives of the present invention described herein to the dry fibrous material of the preforms. The matrix resin is of a viscosity such that, during the resin injection stage, the resin passes through the membrane into the fibrous material. Similar technologies are described in chapter 9 of "Manufacturing Processes for Advanced Composites", F. C. Campbell, Elsevier, 2004.

The preferred thermoset matrices for RTM processes are epoxy or bismaleimide (BMI) with suitable epoxy examples being HexFlow® RTM 6 or RTM 120. A typical BMI matrix is HexFlow® RTM 651. HexFlow® VRM 34 may be used for Vacuum-assisted Resin Transfer Moulding (VaRTM) applications. All of the above materials are available from Hexcel Composites, Duxford, UK.

The reinforcement fibres can be selected from any of the following commercially available high performance fibres which may be used alone or in combination: —aramid (e.g. Kevlar™), glass, carbon, ceramic, hemp, or polyolefin. Carbon fibres are the preferred material, particularly standard or intermediate modulus fibres of between 3000-24000 filaments per fibre tow. The desirable reinforcement form is a woven or non-crimped textile structure of between 150-1000 gm$^{-2}$ fibre areal weight. Typical weave styles include plain, satin and twill weaves. Non-crimped or multiaxial reinforcements can have a number of plies and fibre orientations such as +45/−45; 0/+45/−45; 0/+45/−45/90. Such styles are well known in the composite reinforcement field and are available from a number of companies including Hexcel Reinforcements, Les Avenieres, France.

In a preferred embodiment of the invention the matrix comprises a thermosetting resin, preferably an epoxy resin. A wide variety of epoxy resins are suitable for use in the matrix present disclosure. Epoxy resins are organic materials having an average of at least 1.5, generally at least 2, reactive 1,2-epoxy groups per molecule. These epoxy resins can have an average of up to 6, preferably up to 4, most preferably up to 3, reactive 1,2-epoxy groups per molecule. These epoxy resins can be monomeric or polymeric, saturated or unsaturated, aliphatic, cyclo-aliphatic, aromatic or heterocyclic and may be substituted, if desired, with other substituents in addition to the epoxy groups, e.g. hydroxyl groups, alkoxy groups or halogen atoms.

Suitable examples include epoxy resins from the reaction of polyphenols and epihalohydrins, poly alcohols and epihalohydrins, amines and epihalohydrins, sulfur-containing compounds and epihalohydrins, polycarboxylic acids and epihalohydrins, polyisocyanates and 2,3-epoxy-1-propanol (glycidyl) and from epoxidation of olefinically unsaturated compounds.

Preferred epoxy resins are the reaction products of polyphenols and epihalohydrins, of polyalcohols and epihalohydrins or of polycarboxylic acids and epihalohydrins. Mixtures of polyphenols, polyalcohols, amines, sulfur-containing compounds, polycarboxylic acids and/or polyisocyanates can also be reacted with epihalohydrins. Illustrative examples of epoxy resins useful herein are described in The Handbook of Epoxy Resins by H. Lee and K. Neville, published in 1967 by McGraw-Hill, New York, in appendix 4-1, pages 4-56, which is incorporated herein by reference.

For bisphenol-A type epoxy resin the average epoxy equivalent weight is advantageously from about 170 up to about 3000, preferably from about 170 up to about 1500. The average epoxy equivalent weight is the average molecular weight of the resin divided by the number of epoxy groups per molecule. The molecular weight is a weight average molecular weight.

Preferred examples of epoxy resins are those having an average epoxy equivalent weight of from about 170 to about 200. Such resins are commercially available from The Dow Chemical Company, as D.E.R. 330, D.E.R. 331 and D.E.R. 332 epoxy resins. Further preferred examples are resins with higher epoxide equivalent weight, such as D.E.R. 667, D.E.R. 669 and D.E.R. 732, all of which are commercially available from The Dow Chemical Company, or Araldite MY0500, MY0150, MY0600, MY0610, MY721 from Huntsman.

Another class of polymeric epoxy resins which can be used in the resin matrix includes the epoxy novolac resins. The epoxy novolac resins can be obtained by reacting, preferably in the presence of a basic catalyst, e.g. sodium or potassium hydroxide, an epihalohydrin, such as epichlorohydrin, with the resinous condensate of an aldehyde, e.g. formaldehyde, and either a monohydric phenol, e.g. phenol itself, or a polyhydric phenol. Further details concerning the nature and preparation of these epoxy novolac resins can be obtained in Lee, H. and Neville, K. Handbook of Epoxy Resins, McGraw Hill Book Co. New York, 1967, which teaching is included herein by reference. Other useful epoxy novolac resins include those commercially available from The Dow Chemical Company as D.E.N. 431, D.E.N. 438 and D.E.N. 439 resins, respectively.

In alternative embodiments any resin from the following classes may also be used as the thermoset resin: benzoxazine resins, vinyl ester resins, unsaturated polyester resins, urethane resins, phenol resins, melamine resins, maleimide resins, cyanate resins and urea resins. Any resin suitable for use as a reactant for the reactive cross-linked thermoset coating is suitable for use in the matrix.

A variety of amine curing agents can be used in the matrix. The amine curing agents which may be employed are primarily the multifunctional, preferably di- to hexafunctional, and particularly di- to tetrafunctional primary amines. Examples of such amine curing agents include, but are not limited to, isophorone diamine (IPDA), ethylene diamine, diaminodiphenylsulfones, tetraethyl amine, 2, 4-di-aminotoluene (DAT) diamines and dicyandiamide (DICY). Mixtures of two or more of the amine curing agents can also be used. Also modified hardeners where amines are reacted in vast excess with epoxy resin are good candidates as amine curing agents. Any curing agent suitable for use as a reactant for the reactive cross-linked thermoset coating is suitable for use in the matrix.

The matrix may also comprise an accelerator. Such accelerators are known in the art. Suitable accelerators are, for example, amines, preferably ethylene diamine, diethylene triamine, dicyandiamide, triethylene tetraamine, aminoethyl piperazine, organic acids, e.g. dicarboxylic acids, phenol compounds, imidazole and its derivatives, urea based curing agents e.g. those under the commercial name Urone®, and calcium nitrate.

Embodiments of the inventions will now be described by way of example only and with reference to the below Examples.

Coating of a Structured Veil 100 sheets of thermoplastic V800 veil (Protechnic, Cernay, France) were interleafed with 99 sheets of Aerovac A5000RP3 perforated release film was placed in a silicone tray containing the following composition:

200 g Araldite LY1556 (Huntsman, Duxford, UK)
65 g IPDA (Isophorone diamine) (BASF, Germany)
1000 ml PPG1200 with average molecular weight of 1200 (Sigma Aldrich, Gillingham, UK)

The mixture was placed in an oven at 120° C. for 4 hours. The veils were washed with MEK and dried. A veil comprising a reactive cross-linked thermoset coating was produced.

The veils were successfully laid up, by interleaving with 24 plies of Hexcel 2096 plain weave carbon fibre in a 0/90° quasi isotropic arrangement. The assembly was then infused with RTM6 (Hexcel, Duxford, UK) and cured with the recommended cure schedule of 2 hours at 180° C. to form a cured laminate.

EXAMPLE A1

Additives of the present invention were formed by creating a dispersion comprising:
140 g Rilsan PA11 P (Arkema, France)
1600 ml PPG1200 with average molecular weight of 1200 (Sigma Aldrich, UK)
22.2 g MY0610 (Huntsman, Duxford, UK)
10.2 g Isophorone diamine, (BASF, Germany)

The dispersion was placed in a 2 liter glass dish and stirred with an overhead stirrer to disperse the substrate and to aid dissolution of the reactants. The dispersion was heated using a microwave oven (Daewoo KOR-6L15) to a temperature of 150° C. The dispersion was allowed to cool to 80° C. and then combined with 2.5 L of methylated spirits. This was then filtered under vacuum to a dry residue. The residue was consecutively washed with 1 liter of industrial methylated spirit (IMS), methylethylketone (MEK), and Acetone all under vacuum. The washed residue was then dried in an oven for 12 hours at 50° C. A sample of the A1 particles was analysed for the presence of a reactive coating using a differential scanning calorimeter (DSC). The residue comprising coated particles was combined with 4,4,'-DDS at a ratio of 1:1 and placed in a DSC machine (TA Instruments, Delaware, US). An exothermic event was observed at approximately 175° C. demonstrating that the PA 11 particle had been coated with a reactive coating containing a surplus of epoxy groups.

A sample of the coated particles was heated to a temperature greater than the melting point of PA11. The morphology of the coated particles was examined under a microscope and found to be unchanged.

Coated particles were produced by the above process using a dispersion containing 10 g Rilsan, 100 ml of PPG, 1.4 g of IPDA, 3.04 g MY0610 and 0.4 wt % C.I. solvent violet 13 dye (The soap kitchen, UK). An uncoated control sample of 10 g Rilsan was added to 100 ml of PPG with the same quantity of the dye. Both samples underwent thorough washing using the same method as described above. Both the coated PA 11 and uncoated PA 11 were examined under a microscope. The dye had washed off the uncoated PA 11 particles leaving only a trace, whereas after thorough washing a substantial quantity of dye was visible on the coated PA 11 particles. This suggests the dye was incorporated into or onto the coating of the coated PA 11 particle and not on the uncoated PA 11.

EXAMPLE C1

Additives of the present invention containing carbon black in the coating were produced by creating a dispersion as described above, with the addition of 20% superconductive carbon black.

Microscope examination indicated that the coating had been coloured black as a result, suggesting the conductive carbon black was present in the coating. The black colour persisted even after thorough washing.

COMPARATIVE EXAMPLE U1

Rilsan PA11 P, Uncoated polyamide PA 11 particles

COMPARATIVE EXAMPLE A2

Neat epoxy particles were formed with the same methodology as used to produce the particles of A1 with the exception that the PA11 particles were omitted, instead a dispersion with the following composition was used:
1600 ml PPG1200 with average molecular weight of 1200 (Sigma Aldrich, UK)
22.2 g MY0610 (Huntsman, Duxford, UK)
10.2 g Isophorone diamine, (BASF, Germany)

The dispersion was placed in a 2 Liter glass dish and stirred with an overhead stirrer. The dispersion was heated using an oven and maintained at a temperature of 150° C. for 7 hours.

The dispersion was allowed to cool to 80° C. and then combined with 2.5 L of methylated spirits. This was then filtered under vacuum to a dry residue. The residue was consecutively washed with 1 Liter each of IMS, MEK, and Acetone all under vacuum. The washed residue was then dried in an oven for 12 hours at 50° C.

Cured Resin Test Samples

The additive particles A1 and U1 were combined with a resin composition as follows:
194 g LY3581 Epoxy resin (Huntsman, Duxford, UK)
74 g 4,4'-DDS curing agent (Huntsman, Duxford, UK)
33 g PES (Sumitomo Chemical co Ltd.)
33 g Additive of either Example 1 or Comparative Examples 1 or 2

LY3581 was mixed with the PES and heated to 120° C. until the PES was dissolved. The respective additives A1, U1 were then combined with the resin and mixed using a speed mixer. The mixtures were cooled to 80° C. before the 4,4'-DDS was added, before speed mixing again. In this way two batches were produced containing A1 and containing U1 particles, each batch containing 10 wt % of particles based on the weight of the resin composition. The resin compositions were poured into a mould and degassed in a vacuum oven to remove any excess air. The resin composition were cured in an autoclave at 6 bar with a cure schedule of 0.5° C. per min to 180° C., and they were held at this temperature for 3 hours.

Fracture Toughness Testing

The cured resin batches were cut into seven test samples for each additive particle A1 and U1. The cured resin samples were tested in mode 1 for plane strain critical-stress-intensity factor ($K_{IC}$) and critical strain energy release rate ($G_{IC}$) at fracture initiation. The test methods were performed in accordance with ASTM standard D 5045-99. Crack area was calculated using Keyence Digital Microscope (Keyence UK Ltd. United Kingdom) and UTHSCSA image tool Software (University of Texas, USA). Results of the each set of seven samples per example were averaged and are recorded in table 1.

TABLE 1

| $G_{IC}$ and $K_{IC}$ of coated PA11 and PA11 particles in resin. | | |
|---|---|---|
| | A1 | U1 |
| $G_{IC}$ J/m$^2$ | 519.30 | 304.36 |
| $K_{IC}$ MPa · m$^{0.5}$ | 1.38 | 1.08 |

The invention claimed is:

1. An additive for a thermoset resin matrix, said additive having a core and a cross-linked thermoset coating, wherein the cross-linked thermoset coating is the reaction product of an epoxy thermoset resin and an amine curative which precipitate out of solution from a dispersant onto the surface of the core and wherein said cross-linked thermoset coating comprises reactive amine groups derived from the amine curative, said reactive groups being disposed on the surface of said cross-linked thermoset cross-linked thermosetting coating, said core comprising a veil, and wherein the dispersant is bound to surface of the crosslinked thermoset coating at a concentration of no greater than 0.001 weight percent based on the weight of the additive.

2. The additive according to claim 1 wherein the core is a thermoplastic core.

3. The additive according to claim 2 wherein said thermoplastic comprises a polyamide.

4. The additive according to claim 1 wherein the thermoset resin matrix comprises an epoxy resin or a bismaleimide resin.

* * * * *